Figure 1:
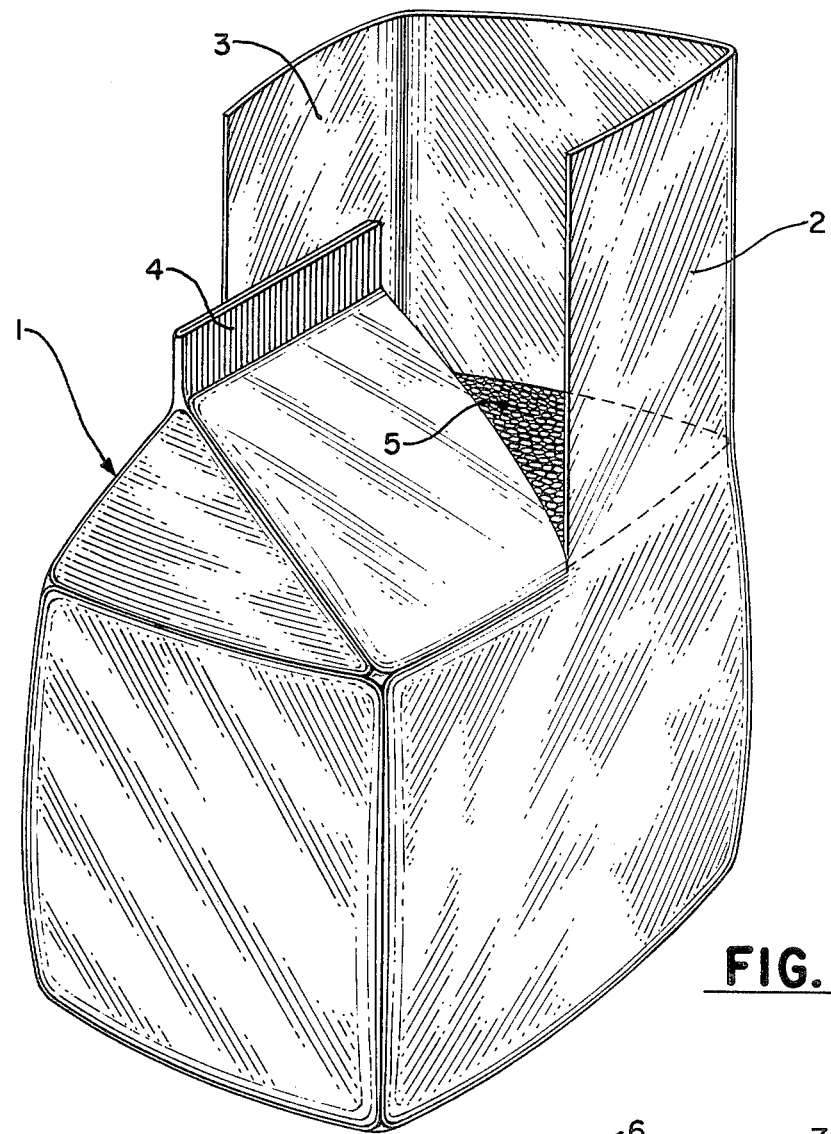

United States Patent [19]

Butler et al.

[11] 4,248,348
[45] Feb. 3, 1981

[54] PACKAGE FOR COMPOUNDING RUBBER AND COMPOUNDED RUBBER

[75] Inventors: Kim D. Butler, Uniontown; Ray A. Young, East Sparta; Alfred L. Brown, Akron, all of Ohio

[73] Assignee: The Goodyear Tire & Rubber Company, Akron, Ohio

[21] Appl. No.: 59,804

[22] Filed: Jul. 23, 1979

[51] Int. Cl.³ .................. B65D 81/00; B65D 85/00; B32B 7/02
[52] U.S. Cl. .................. 206/447; 206/219; 206/524.6; 206/524.7; 428/35
[58] Field of Search .................. 206/447, 524.6, 524.7, 206/219; 428/35; 260/876 B

[56] References Cited

U.S. PATENT DOCUMENTS

| | | | |
|---|---|---|---|
| 2,572,959 | 10/1951 | Sparks et al. | 206/447 |
| 2,762,504 | 9/1956 | Sparks et al. | 206/447 |
| 2,791,327 | 5/1957 | Sparks et al. | 206/447 |
| 3,784,005 | 1/1974 | McVay | 206/219 |
| 3,902,596 | 9/1975 | McVay | 206/219 |
| 4,112,158 | 9/1978 | Creekmore et al. | 206/447 |

FOREIGN PATENT DOCUMENTS 955079  4/1964  United Kingdom ............ 206/219

Primary Examiner—William T. Dixson, Jr.
Attorney, Agent, or Firm—H. C. Young, Jr.

[57] ABSTRACT

A package comprised of (A) an article selected from unvulcanized rubber or compounding ingredients therefor and (B) a protective film of a thermoplastic ethylene/vinyl acetate copolymer containing anti-block agent and having a vinyl acetate content in the range of 11 to 22 percent. The invention further relates to a compounded rubber comprised of a mixture of unsaturated rubber and a package of compounding ingredients contained in the ethylene/vinyl acetate copolymer film.

14 Claims, 2 Drawing Figures

PACKAGE FOR COMPOUNDING RUBBER AND COMPOUNDED RUBBER

TECHNICAL FIELD

This invention relates to packaged materials for compounding rubber and to rubber compounds therewith.

BACKGROUND ART

Unvulcanized rubber and compounding ingredients therefor are often packaged by wrapping with thermoplastic film or placing in bags thereof. Polyethylene is conventially used because of its plasticity, antiblock property, because it can be obtained in a desirable melting temperature range and at a relatively low cost.

However, polyethylene is disadvantageous because, when mixed with unvulcanized rubber, does not disperse sufficiently in the matrix. This leaves minute areas within the matrix of the rubber when cured, which are themselves not cured and are subject to degradation.

Various solutions have been proposed. Very low softening point polyethylene has been used. Compounded elastomeric styrene/butadiene/styrene block copolymer films have been used with success but are considerably more costly than polyethylene and sometimes do not provide an effective packaged article when its contents include oil of the rubber-processing type. Although it has not been fully ascertained, it appears that films of ethylene/vinyl acetate copolymers containing about 28–30% vinyl acetate have been used although the inventors' evaluation of such films has indicated them to be generally unsatisfactory and without sufficient strength under test to package and contain rubber compounding ingredients, particularly when containing a rubber processing oil.

Therefore, it is an object of this invention to provide packaged materials for compounding rubber with a suitable film and to provide rubber compounded with such a package.

DISCLOSURE AND PRACTICE OF INVENTION

In accordance with this invention a package is provided which comprises (A) an article selected from at least one of unvulcanized rubber or compounding ingredients for unvulcanized rubber packaged in (B) a protective film having a thickness in the range of about 0.5 to about 10, preferably about 1 to about 5, mils of a thermoplastic ethylene/vinyl acetate copolymer containing an anti-block agent and having a vinyl acetate content in the range of about 11 to about 22, preferably about 14 to about 19, percent and further characterized, that when having a thickness of about 2 to 4 mils, by a melting point in the range of about 85° C. to about 95° C., a minimum ultimate tensile strength at 25° C. of about 1850 psi, an oil solubility melt index of about 63° C. to about 75° C. and a minimum of 300 percent modulus at 25° C. of about 700 psi.

It is understood that the film composite of this invention desirably can contain various typical lubricants, fillers, pigments and dyes and stabilizers and is required to contain a minimal amount of anti-block agent sufficient to provide an anti-block quality to the surface of the film.

Thus, in the practice of this invention, a method of compounding rubber is provided and the resulting compounded rubber, which comprises mixing unvulcanized rubber, particularly high unsaturation rubber, with the package of this invention containing conventional rubber compounding ingredients optionally followed by sulfur curing said prepared mixture of rubber, packaging film and packaged ingredients. The invention is particularly applicable where the compounding ingredients contain about 0.5 to about 10 weight percent rubber processing oil.

In the further practice of this invention a packaged unvulcanized rubber, particularly a high unsaturation rubber and particularly a packaged unvulcanized rubber for storage, comprises such unvulcanized rubber substantially encompassed with a wrap of the film required for this invention. In practice, the film is generally applied around the unvulcanized rubber, especially when in bale form, usually under some tension so that it more firmly wraps the rubber and then heat sealed against itself to complete the package.

The thermoplastic packaging film of this invention, containing a conventional-type anti-block agent, is characterized by being able to be pulled apart from itself after two sides being pressed together, without appreciably destroying the film itself.

In the practice of this invention, the film of the ethylene/vinyl acetate copolymer can be formed by extrusion or solution cast methods. Extrusion is often preferred. For solution casting, the copolymer and anti-block agent may be dissolved in an organic solvent followed by mixing therewith any additionally required materials. The mixture may be cast as a film onto a substrate, dried by evaporating the organic solvent to yield the required composition in the form of a film and the film stripped from the casting substrate. Typically, the mixture can probably be dried at a temperature of about 40° C. to about 150° C. depending primarily upon the organic solvent used. It should be readily understood that if the composition is to be dried as a thin film, reduced temperatures and times can probably be used such as, for example, a temperature in the range of about 70° C. to about 90° C. for a period of about 15 to about 60 minutes.

Various rubber compounding resins and ingredients especially resins such as hydrocarbon resins can be packaged according to this invention and then compounded with unvulcanized rubber. Representative of the various compounding ingredients are fillers, such as clay, silicates, calcium carbonate and the like; accelerators, such as, for example, cadmium diethyldithiocarbamate, tetramethylthiuram disulfide, benzothiazyl disulfide and the like; antioxidants, such as the well-known substituted thioesters and amine type; antiozonants, such as aniline derivatives, diamines and thioureas; curatives such as sulfur, sulfur providing compounds and peroxides; ultraviolet agent such as substituted benzotriazoles and substituted benzophenones; color pigments, such as iron oxide, titanium dioxides and organic dyes; reinforcing pigments, such as carbon black, zinc oxide and hydrated silicon compounds; and processing aids, such as silicon dioxide, pumice, stearate and rubber processing oils.

In this manner, the term "packaged" relates to both bagged or wrapped compounding ingredients, and particularly to mixtures thereof containing about 0.5 to about 10 preferably about 0.5 to about 6, weight percent rubber processing oil. Such compounding ingredients, even when containing the rubber processing oil, are preferably free flowing without any substantial sticking together to impede their flow.

Unvulcanized rubber can also be advantageously packaged according to this invention, usually as bales of rubber.

Representative of the various unvulcanized rubbers which can be packaged or which can be mixed with packaged compounding ingredients therefor are natural rubber, synthetic cis-1,4-polyisoprene, polybutadiene, rubbery butadiene/styrene copolymers and rubbery butadiene/acrylonitrile copolymers. All of such rubbers are of the high unsaturation type. Namely, they contain an appreciable amount of carbon-to-carbon double bonds therein. Although this invention is partly directed to the packaging of the high unsaturation-type rubbers, or compounding ingredients therefor, the low unsaturation type can also be used if desired. Representative of such low unsaturation rubbers are butyl rubber, which is typically a copolymer containing a major amount of isobutylene and a minor amount of isoprene, as well as the various ethylene/propylene copolymers and rubbery terpolymers of ethylene/propylene and a minor amount of non-conjugated diene.

An anti-block additive for the film of the package is particularly useful where the packaged material is rubber which is to be stacked or "containerized" together in order to prevent them from sticking to each other and making them virtually impossible to separate without actually destroying portions of the package and material. The importance of such an advantage is amplified by the following discussion.

Polyethylene film (PE) is generally used to overwrap bales of rubber or to package compounding ingredients therefor to simplify handling and use. For most applications, the overwrapped bale is used intact; thus, the bale is charged into a banbury or another suitable mixer and the PE film is mixed into the rubber compound during the mixing cycle. However, in various applications, the polyethylene film has not been sufficiently dispersed and has caused defects to occur in the end-product curing use and is, therefore, not a suitable overwrap or packaging material or container bag.

Films of this invention disperse substantially readily in a rubber compound when mixed using conventional equipment. Even if complete dispersion is not achieved, defects in the rubber, when cured, from the film are minimized because of its solubility and/or dispersability and placticity in the rubber matrix.

Figure 2:
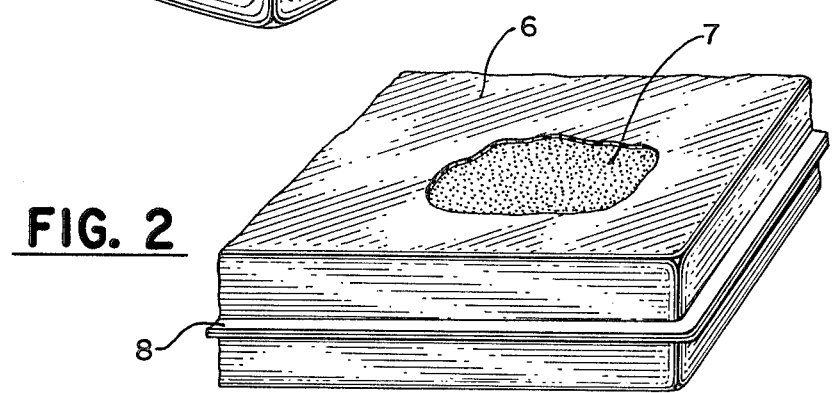

For further understanding of this invention, reference may be had to the accompanying drawing in which FIG. 1 depicts a package comprised of rubber packaged in the required ethylene/vinyl acetate copolymer film compounding ingredients and FIG. 2 shows a package of an unvulcanized rubber with the film.

Referring to the drawings, FIG. 1 shows a package comprised of a bag of ethylene/vinyl acetate film 2 containing about 16 percent vinyl acetate and having an opening at its top 3 which can be optionally sealed 4, such as by heat sealing. The package 1 contains a mixture of conventional compounding ingredients 5 for unvulcanized, high unsaturation rubber which contains about 5 weight percent rubber processing oil mixed therewith.

FIG. 2 shows a packaged bale 6 of high unsaturated rubber 7, optionally compounded by mixing about 3.5 parts by weight of the package 1 of FIG. 1 with 40 parts by weight natural rubber and 60 parts by weight polybutadiene rubber, packaged with the required film for this invention and heat sealed 8.

The practice of this invention is further illustrated by reference to the following examples which is intended to be representative rather than restrictive of the scope of the invention. Unless otherwise indicated, all parts and percentages are by weight.

EXAMPLE 1

A series of films having a thickness in the range of about 2 to 4 mils were obtained. The individual tough translucent films had various vinyl acetate derived contents ranging from 5 to 29 percent.

A silica anti-block agent was included in the composition of the films.

The various ethylene/vinyl acetate copolymer films evaluated are shown in the following Table 1 and identified herein as films or Examples A–G. Example G was actually a physical blend of polyethylene and poly(vinyl acetate) rather than a copolymer.

TABLE 1

| Films | Percent Vinyl Acetate | Softening Point[1] |
|---|---|---|
| A | 5 | 225° F. |
| B | 12 | 208 |
| C | 15 | 191 |
| D | 18 | 189 |
| E | 20 | 189 |
| F | 29 | 126 |
| G | 28 | N/A[2] |

[1] determined by differential scanning calorimeter(DSC)
[2] not applicable since the film was a physical mixture The films were first evaluated or tested for (1) dispersability in unvulcanized rubbers which were then sulfur vulcanized and examined. If the film passed this test, it was submitted to a stacking test (2) which comprised filling bags made from films with 20 pounds of rubber compounding ingredients containing about 0.5 to about 6 weight of a relatively high aromatic-type rubber processing oil and stacking the packages to an extent of five packages high in a heated, or hostile, environment of about 100° F. for a period of about six days; and (3) a handling test which comprised actual use under factory conditions.

Thus, generally, if the film did not pass the dispersability test, it was not submitted to the further tests.

The results of the tests are shown in the following Table 2 with the films or experiments, A–G corresponding to the films A–G of Table 1.

TABLE 2

| Film | Dispersion Test No. 1 | Stacking Test No. 2 | Handling Test No. 3 |
|---|---|---|---|
| A | failed | N/A | N/A |
| B | passed | passed | passed |
| C | passed | passed | passed |
| D | passed | passed | passed |
| E | passed | passed | passed |
| F | passed | passed | failed |
| G | failed | N/A | N/A |

Results of these tests show that (1) ethylene/vinyl acetate copolymer films containing from 12 to 20% vinyl acetate content passed tests designed to determine their suitability for use as packaging films for rubber compounding ingredients which are to be mixed and cured with sulfur vulcanizable rubber; (2) copolymers with substantially more than 20% or less than 12% vinyl acetate content were found to not entirely pass these tests; and (3) physical blends of polyethylene and a substantial amount of poly vinyl acetate did not pass the dispersion test although a copolymer with similar vinyl acetate content did.

While certain representative embodiments and details have been shown for the purpose of illustrating the invention, it will be apparent to those skilled in this art that various changes and modifications may be made therein without departing from the spirit or scope of the invention.

We claim:

1. A package which comprises (A) an article selected from at least one of unvulcanized rubber or compounding ingredients for unvulcanized rubber packaged in (B) a protective film having a thickness in the range of about 0.5 to about 10 mils of a thermoplastic ethylene/vinyl acetate copolymer containing an anti-block agent and having a vinyl acetate content in the range of about 11 to about 22 percent and further characterized, when having a thickness of about 2 to 4 mils, by a melting point in the range of about 85° C. to about 95° C., a minimum ultimate tensile strength at 25° C. of about 1850 psi, an oil solubility melt index of about 63° C. to about 75° C. and a minimum 300 percent modulus at 25° C. of about 700 psi.

2. The package of claim 1 where said packaged article is at least one compounding ingredient for unvulcanized rubber and where its said protective packaging film has a thickness in the range of about 1 to about 5 mils where said copolymer has a vinyl acetate derived content in the range of about 14 to about 19 percent.

3. The package of claim 1 where said article is an unvulcanized high unsaturation rubber.

4. The package of claim 2 where said compounding ingredients are free flowing and are selected from at least one of clay, silicates, calcium carbonate, cadmium diethyldithiocarbamate, tetramethylthiuram disulfide, benzothiazyl disulfide, substituted thio esters and amine type antioxidants, aniline antiozonant derivatives, diamines and/or thiourea curatives selected from sulfur, sulfur providing compounds and peroxides, ultraviolet agents selected from substituted benzotriazoles and substituted benzophenones; color pigments, selected from iron oxide, titanium dioxides and organic dyes; reinforcing pigments selected from carbon black, zinc oxide and hydrated silicon compounds; silicon dioxide, and also a minor amount of rubber processing oil when mixed with at least one other of such compounding ingredients.

5. A compounded rubber comprised of a mixture of unsaturated rubber and the package of claim 1.

6. A compounded high unsaturation rubber with the package of claim 2, where said compounding ingredients are relatively free flowing and contain about 0.5 to about 10 weight percent rubber processing oil.

7. The compounded rubber of claim 6 where said compounding ingredients are free flowing and are selected from at least one of clay, silicates, calcium carbonate, cadmium diethyldithiocarbamate, tetramethylthiuram disulfide, benzothiazyl disulfide, substituted thio esters and amine type antioxidants, aniline antiozonant derivatives, diamines and/or thiourea, curatives selected from sulfur, sulfur providing compounds and peroxides, ultraviolet agents selected from substituted benzotriazoles and substituted benzophenones; color pigments, selected from iron oxide, titanium dioxides and organic dyes; reinforcing pigments selected from carbon black, zinc oxide and hydrated silicon compounds; silicon dioxide, and also a minor amount of rubber processing oil when mixed with at least one other of such compounding ingredients.

8. The compounded rubber of claim 2 or 3 where said high unsaturation rubber is selected from at least one of natural rubber, synthetic cis-1,4-polyisoprene, polybutadiene rubbery copolymers of 1,3-butadiene/styrene and/or rubber copolymers of butadiene and acrylonitrile.

9. A packaged, high unsaturation unvulcanized rubber which comprises such unvulcanized rubber substantially encompassed with a wrap of a protective film having a thickness in the range of about 0.5 to about 10 mils of a thermoplastic ethylene/vinyl acetate copolymer containing an anti-block agent and having a vinyl acetate content in the range of about 11 to about 22 percent and further characterized, when having a thickness of about 2 to 4 mils, by a melting point in the range of about 85° C. to about 95° C., a minimum ultimate tensile strength at 25° C. of about 1850 psi, an oil solubility melt index of about 63° C. to about 75° C. and a minimum 300 percent modulus at 25° C. of about 700 psi.

10. A method of compounding rubber which comprises mixing unvulcanized rubber with the package of claim 1.

11. The method of claim 10 where said rubber is a high unsaturation rubber where said copolymer of said film has a vinyl acetate derived content in the range of about 14 to about 19 percent.

12. The sulfur cured compounded rubber of claim 5.
13. The sulfur cured compounded rubber of claim 6.
14. The sulfur cured compounded rubber of claim 7.

* * * * *